United States Patent [19]

Finnegan et al.

[11] Patent Number: 4,482,785

[45] Date of Patent: Nov. 13, 1984

[54] REFRIGERATION MONITOR SYSTEM WITH REMOTE SIGNALLING OF ALARM INDICATIONS

[76] Inventors: Christopher D. Finnegan, 916 SW. 116th Way, Fort Lauderdale, Fla. 33325; Arthur J. Geiss, 1 S. Pine Island Rd., Plantation, Fla. 33323

[21] Appl. No.: 421,982

[22] Filed: Sep. 23, 1982

[51] Int. Cl.³ ......................................... H04M 11/04
[52] U.S. Cl. ................................. 179/5 P; 340/539; 340/585
[58] Field of Search ............... 179/5 R, 5 P; 340/585, 340/539

[56] References Cited

U.S. PATENT DOCUMENTS

| | | | |
|---|---|---|---|
| 3,441,929 | 4/1969 | Coffer et al. | 340/409 |
| 3,544,722 | 12/1970 | Hartfield et al. | 179/5 P |
| 3,772,668 | 11/1973 | Smith | 340/539 X |
| 3,899,645 | 8/1975 | Brafman | 179/5 R X |
| 3,925,622 | 12/1975 | Robinson | 179/5 P X |
| 4,025,922 | 5/1977 | Trawick | 340/539 X |
| 4,028,688 | 6/1977 | Goleman | 340/227.1 |
| 4,051,327 | 9/1977 | Rigsby | 179/5 R |
| 4,064,368 | 12/1977 | Dibner | 179/5 R |
| 4,146,886 | 3/1979 | Timblin | 340/585 |
| 4,241,237 | 12/1980 | Paraskevakos et al. | 179/5 R |
| 4,273,961 | 6/1981 | Blank et al. | 179/5 R |
| 4,278,841 | 7/1981 | Regennitter et al. | 179/5 R |
| 4,361,730 | 11/1982 | Barber et al. | 179/5 R |
| 4,371,751 | 2/1983 | Hilligoss, Jr. et al. | 179/5 R |

FOREIGN PATENT DOCUMENTS

| | | | |
|---|---|---|---|
| 51383 | 5/1982 | European Pat. Off. | 179/5 R |
| 2051520 | 1/1981 | United Kingdom | 179/5 R |

Primary Examiner—Keith E. George
Attorney, Agent, or Firm—Oltman and Flynn

[57] ABSTRACT

A refrigeration monitor system for monitoring an unattended freezer installation having a number of freezer compartments containing perishable products. The system comprises a network of temperature sensors located in the freezer compartments and connected to a common control which is connected to one or more telephone lines. The common control is capable of dialling in sequence anyone of a group of selected alarm numbers. The person answering the alarm call receives a recorded message and must return a preselected answer code that is received by the system, and which stops the system from sending more alarm calls. The system continues to dial alarm numbers until it receives a satisfactory answer code. As a further safety measure the system, upon initiating an alarm, sets an alarm status indicator that must be manually reset within a preset time by the person attending to the freezer installation in response to the alarm, or else a new alarm sequence is automatically initiated. The system also provides means for remotely testing the system by dialling the system from one of the alarm numbers.

10 Claims, 8 Drawing Figures

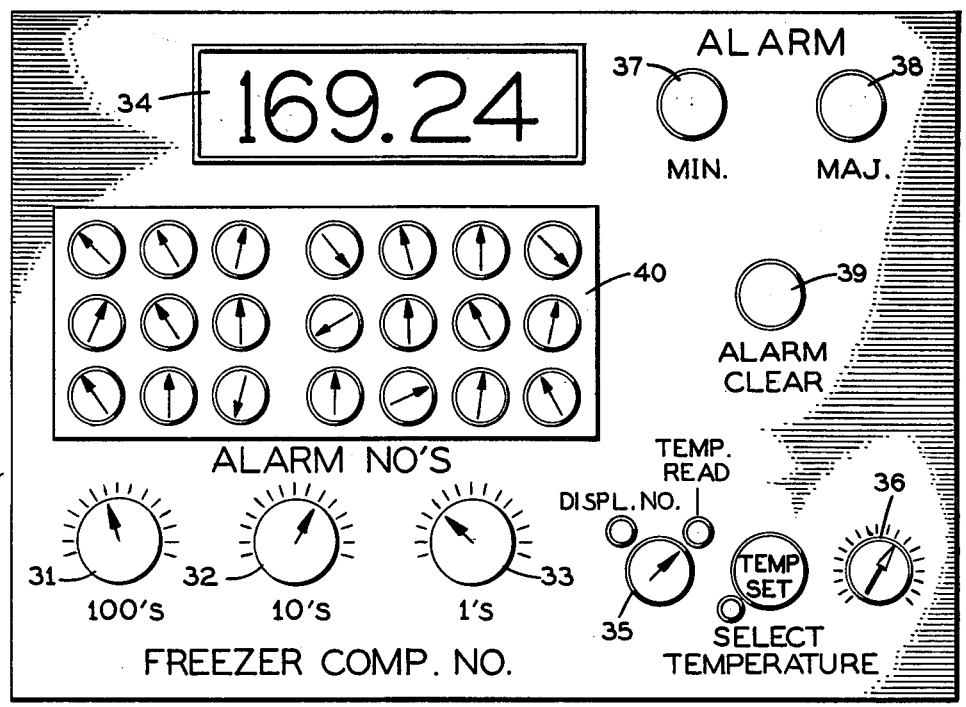

REFRIGERATION MONITOR SYSTEM WITH REMOTE SIGNALLING OF ALARM INDICATIONS

BACKGROUND AND PRIOR ART

In meat, produce and general food vending and storage establishments that usually store large amounts of such perishable products, it is an ever present hazard that the establishment's refrigeration system could fail, either in its totality or in parts, thereby causing substantial losses from spoilage.

Such hazard is present especially during the hours when no attendants are available to take remedial actions.

Inventors have in the past sought solutions to this problem.

U.S. Pat. No. 3,544,722 by C. Hartfield et al., issued Dec. 1, 1970 entitled Security System describes a general alarm system for summoning assistance in response to a plurality of mishaps, such as break-in, fire, cold storage failure and so forth in response to sensors. The system provides automatic dialing to preselected telephones and depends on the mere presence of a human voice that answers the call as confirmation of receipt of the call. Such reliance on the mere presence of a voice may be disceiving, since the wrong party might answer and not understand the message, or the answer could be produced by an answering machine.

U.S. Pat. No. 3,441,929 by W. E. Coffer et al issued Apr. 29, 1969 entitled Remote Reporting System describes a general alarm system for reporting burglary, fire, refrigeration failure, etc. It depends on signalling a dedicated receiving station and indicate the different conditions by means of signals generated by motor driven cams.

U.S. Pat. No. 4,028,688 by J. B. Goleman issued June 7, 1977, entitled Refrigeration Unit Air Temperature Detection Alarm System describes a refrigeration alarm system comprising temperature sensors, automatic telephone dialer and recorded message announcer. It also describes the use of a wireless radio connection between freezer compartments and the alarm system.

The system provides no means for verification of the receipt of the alarm message.

U.S. Pat. No. 4,146,886 by S. W. Timblin issued Mar. 27, 1979 entitled Freezer Alarm With Extended Life describes a freezer alarm device for locally indicating a freezer malfunction. It has no remote reporting capability.

U.S. Pat. No. 4,278,841 by Regennitter et al., issued July 14, 1981, entitled Multiple Station Temperature Alarm System describes a freezer monitor system with wireless radio connection between the freezer compartments and the alarm system. The invention also describes an automatic telephone dialer combined with a recorded message circuit to deliver a message when the call is answered.

Nowhere in the prior art known to the applicant is there a disclosure of an arrangement for securing that the alarm message that has been automatically dialed through a telephone connection has actually been received and understood by an answering party who is prepared to deal with the alarm situation.

The present invention describes an alarm system that requires an affirmative response code that is detected by the alarm sending system and confirms that the answering person anticipates the alarm call and is prepared to deal with it. The present invention has several other novel attributes that contribute to the construction of a system that is failsafe to a high degree.

The present invention further overcomes earlier problems by introducing a refrigeration monitor system that offers several safeguarding features by means of a highly flexible form of control best known as stored program control. Such a control, not only allows a high degree of flexibility in adapting a refrigeration monitor system to changing requirements as they are found from one establishment to the next, but it also allows the designer of such a system to add features that in older systems with hardwired controls would have been very difficult to realize.

The introduction of stored-program control of complex systems has become economically feasible in recent years with the introduction of the so-called microprocessor with associated memory blocks that may contain control programs with literally thousands of system commands and instructions.

There are several books describing the operation and concepts of stored program control. One such book is "Microcomputer-Based Design" by John B. Peatman, published by McGraw-Hill and having Library of Congress catalog number ISBN-0-07-049138-0.

The use of a refrigeration monitor system according to the present invention has the additional advantage that the physical construction of the system may be based on readily available hardware components, that are relatively simple in operation, are very reliable and are relatively inexpensive and have moderate power drain.

It is therefore a primary object of the present invention to provide a refrigeration monitor system that is failsafe to a high degree without undue complexity.

It is another important object of the invention to provide a refrigeration monitor system that is capable of rendering a high degree of utility by means of mutually cooperating features.

It is another important object of the invention to provide a refrigeration monitor system that is capable of rendering a high degree of utility without undue complexity as it relates to its physical construction.

It is still another object of the invention to provide a refrigeration monitor system that is capable of rendering a high degree of flexibility and utility without undue complexity or cost.

It is still another object of the invention to provide a refrigeration monitor system that is capable of rendering a high degree of flexibility and utility without the need for excessive power drain.

Other objects and advantages of the invention will become clear in the course of the following description.

BRIEF DESCRIPTION OF THE DRAWINGS

FIG. 3 is a front, diagrammatic view of the control panel with number display and control dials; and FIG. 4 is a schematic block diagram of the line control unit.

DETAILED DESCRIPTION OF THE INVENTION

In the following description of preferred embodiments of the invention the terminology used is for description and not for limitation. Also, it should be understood that the invention is capable of other embodiments that may be obvious to those skilled in the art and that fall within the scope of the invention.

Figure 1A:
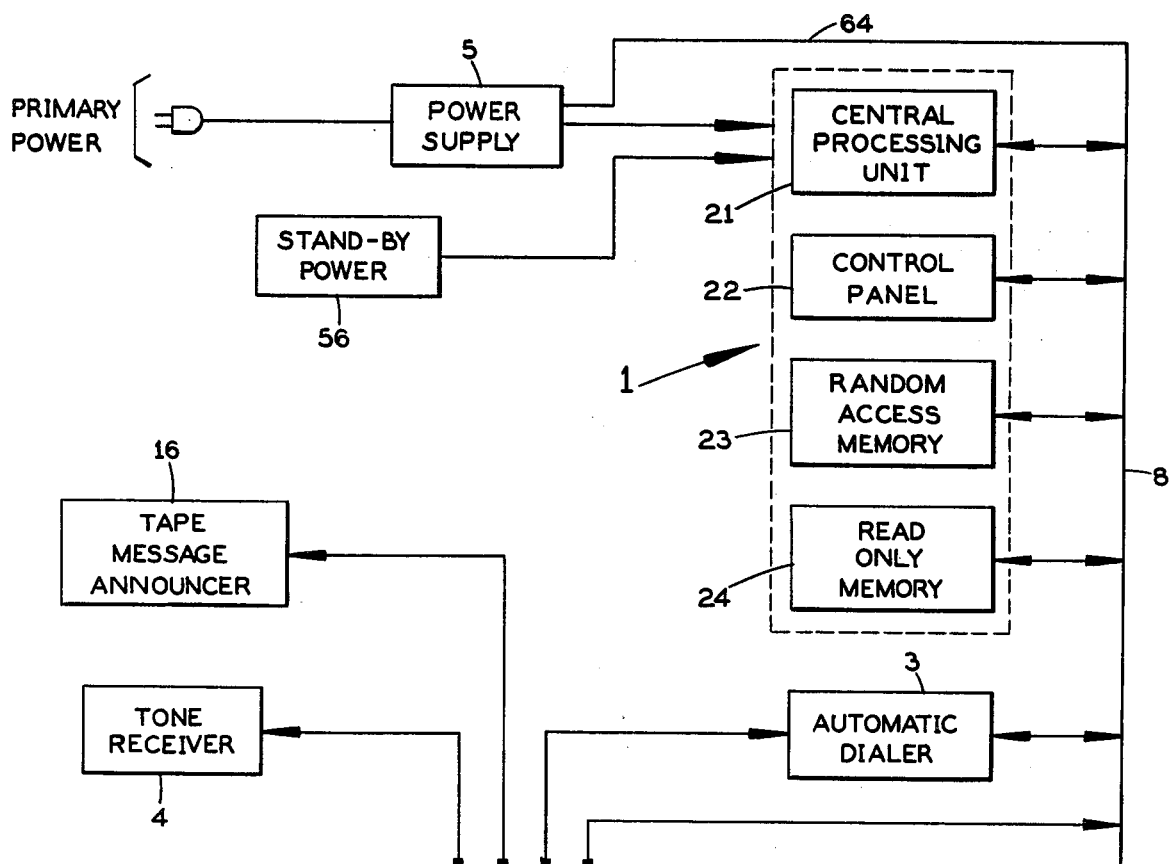
FIG. 1a is a schematic block diagram of the invention showing the major functional system blocks of the control section.

FIG. 1a, b and c is a functional block diagram of the invention showing the major function blocks and their interconnection.

The stored program central control unit, shown generally at 1, consists of a central processing unit (CPU) 21, with a control panel 22, random access memory (RAM) 23 and a read only memory (ROM) 24. The central processing unit 21 is typically a so-called microprocessor, such as are now manufactured by a number of companies. A typical unit is the Intel type 8080, or a Motorola type 6800, or a Texas Instrument type 9900. Each of these units have different systems architectures, but they are all capable of performing the functions required for the present invention. In order to perform these functions, CPU must be connected to an electronic memory unit that contains the so-called control program. In the present embodiment of the invention, the ROM, 24, contains the control program. The control program is a listing of functional steps, also called instructions, that the CPU relies on to perform the control of the system.

The different manufacturers of CPU's publish detailed operating instructions for their particular units, and they usually have different instruction sets. The ROM 24 holds the control program in permanent form that is not lost in the case of power failure. The RAM, 23, contains data that are transient and are changing all the time. This information is lost if primary power to the system is momentarily disconnected, unless steps are taken to supply standby power for such eventuality.

The control panel 22, FIG. 3, contains number displays, switches and other components that are manually used and are set by the operating personnel to supervise the condition of the refrigeration system, and to control the monitor system.

The control panel, generally at 22, is shown in more detail in FIG. 3. It has three dials 31, 32 and 33, labeled "Freezer Comp. No," that are used to select any individual freezer compartment up to a maximum of 999 units. A selector dial 35 has three positions of which one labeled "Comp. No. Display" displays and verifies the freezer unit number selected by the dials 31, 32 and 33. The next position, clockwise labeled "Read Temp." displays the temperature being read on the selected freezer compartment. The third position of the selector, labeled "Temp. Set" operates to set the desired temperature limit for the selected freezer compartment, in one of the embodiments that provides this capability.

The individual units of the central control unit 1 communicate with each other via a digital bus 8, under control of the CPU 21, using a bus protocol established by the manufacturer of the CPU. Other system units are connected to the bus, such as the automatic dialer 3, and the line control 2.

It should be noted that some CPU systems employ a common bus for communication between all system units, while other CPU systems employ one bus for the communication between the CPU and the memory units and another or several buses for interaction with other systems units. The nature of the bus system used is immaterial for the function of the invention, as long as a working bus system is provided. The method of operation of bus systems is well known and is explained in books written on the subject of stored program systems and microcomputers. The above listed reference Microcomputer-Based Designs covers the subject in great detail.

The Line Control Unit 2 is another major functional block in the refrigeration monitor system. It contains the basic voice and tone switching elements.

A plurality of telephone lines a, b and c connect the line control unit to the central telephone exchange serving the particular refrigeration establishment. The lines will normally be shared with the internal telephone facilities serving the establishment, and it may therefore not be assured that any shared line is always available for use by the monitor system at the moment a freezer alarm arrives.

In another arrangement, only a single telephone line may be provided, but that line should then be dedicated to the exclusive use of the monitor system.

An advantage of the multiline system resides in the fact that any one telephone line could be out of order, but it is unlikely that all of a plurality of lines would be disabled at the same time. In the case a single dedicated line is used to serve the monitor system, it may be necessary to provide a telephone instrument 51 for the purpose of testing that line.

The line control 2 is shown in diagrammatic form in FIG. 4. Three lines a, b and c to the central telephone exchange can be accessed by a selector switch 43 with switch drive apparatus 42. Line sense apparatus 48 senses the free-busy status of any line a, b or c, and transmits that status information to switch drive 42.

In case a freezer alarm suddenly takes place, switch drive 42 operates to connect switch contact 43 to a free line, and make it busy. Switch contact 43 is connected to cluster of switches 44, 45, 46 and 47. These switches are under control of the switch control 52, which operates to open or close aforesaid switches under control of the bus 8 from the CPU.

Since FIG. 4 is an abbreviated diagram, a number of details of secondary importance have been omitted in the interest of brevity and clarity. In the practical embodiment, each of the connecting lines will consist of at least two conductors, and the switches will correspondingly have at least two contacts connected to said conductors.

In the following description of the line control, the convention, that an open contact means an open circuit and a closed contact means a closed or conducting circuit, is used.

Also, when the switch contacts are shown in the open condition, that means that in the unpowered, neutral condition, the contact is open. Conversely, if the contact is shown in closed condition, that indicates the unpowered condition of the switch.

Upon receiving a signal to initiate an alarm, the switch 43 initiates a search for a free line, a, b or c. On finding a free line, e.g. line a, switch 43 connects itself thereto and makes the line busy by connecting a holding bridge 41 thereto by means of switch 47 The holding bridge is an inductor of high impedance to audio frequencies, but of a relatively low dc-resistance, which enables dc-current to flow in line a. After being seized, the central office sends out dial tone, which indicates that it is ready to receive dial pulses. Upon seizure, a tone receiver 4 is connected to the line by switch 46. The tone receiver is responsive to various tones, in particular dial tone and to the tones known as dual-tone multi-frequency tones used for network address signalling. Dual-frequency tones are the tones generated by a so-called Touch-Tone ® (Registered trademark by Western Electric, Inc.) telephone instrument when one of the number keys on the instrument are depressed.

Not all central offices provide a dial tone that is readily usable for detection by a tone receiver. In such cases, a fixed delay usually of a few seconds is introduced by the line control before sending commences. As soon as the central office is ready to receive dial pulses, an automatic dialler 3 is connected to the line. The automatic dialler may send dual tone frequencies or rotary dial pulses. In the latter case, switch 47 to the holding bridge 41 must be opened during the transmission of the dial pulses. The automatic dialler receives the digits of the telephone number to be dialled from the CPU over the bus 8. The CPU in turn obtains these digits from dials on the control panel or the digits may alternately be stored in a memory section that is protected against memory loss in case of power failure.

The telephone numbers dialled represent the numbers of locations where the individual answering the phone is anticipating such a call and is prepared to respond thereto.

Since there is, presently, no reliable automatic indication available for the line control apparatus to be informed of the fact that the called number station has answered, a tape message announcer 16 is connected to the line by switch 45 as soon as the number has been dialled. The tape message announcer keeps repeating a brief message that informs the answering party of the origin and nature of the call. The called party upon hearing the message responds by dialling from his telephone a pre-arranged answer code. His phone has to be of the Touch-Tone ® type, and the tone receiver 4 which is still connected to the line, receives and detects the digits of this answer code, which it converts to a digital signal code that is transmitted to the CPU via bus 8. Upon receiving the answer code, the CPU causes the line control to disconnect from the line and revert to its neutral state. This act frees the called party's telephone, and he can now proceed to use his telephone to initiate whatever actions are needed to respond to the alarm message.

In dialling the called telephone number over the public telephone system, it cannot always be assured that a connection is established, because a number of things may happen to prevent such a connection. The called telephone may be busy, or the telephone network may not be able to provide the connection or it may in error have reached a wrong number or it may not have made any connection at all. Such things do happen in spite of the telephone company's efforts to prevent them. Audible signals are provided which enable a human dialler to ascertain the status and progress of the call by listening to various call progress tones or recordings, but these signals are not normally intended for detection by automatic apparatus. It is therefore a part of the invention that an answer code must be received from the called station from a person before the apparatus can determine that a dialled alarm has been completed and understood.

In case the first dialled number does not answer, the line control keeps the connection for a preselected period of time, e.g., 30–60 seconds, and then the connection is terminated by opening the holding bridge 41 by switch 47. Next the CPU selects a second, alternate alarm number which is then dialled according to the above procedure described for the first number.

If that number too fails to produce an answer code, a third, a fourth or a fifth number and so forth may be selected, depending on the number of alarm numbers stored in memory that are available. If the last number is used, the system starts again with the first number and continues to try until an answer code is finally received.

In order to test the telephone lines or make an outgoing call, a telephone instrument 51 with plug-ended cord is optionally provided, which may be inserted into the respective line by means of test jacks 49a, 49b or 49c.

The line control is activated by a temperature sensor in one of the freezer compartments indicating a temperature above that allowed for that compartment.

The arrangement of the temperature sensors may take different forms depending, among other factors, on the physical size of the refrigeration establishment, and the number of freezer compartments to be monitored.

Figure 1B:
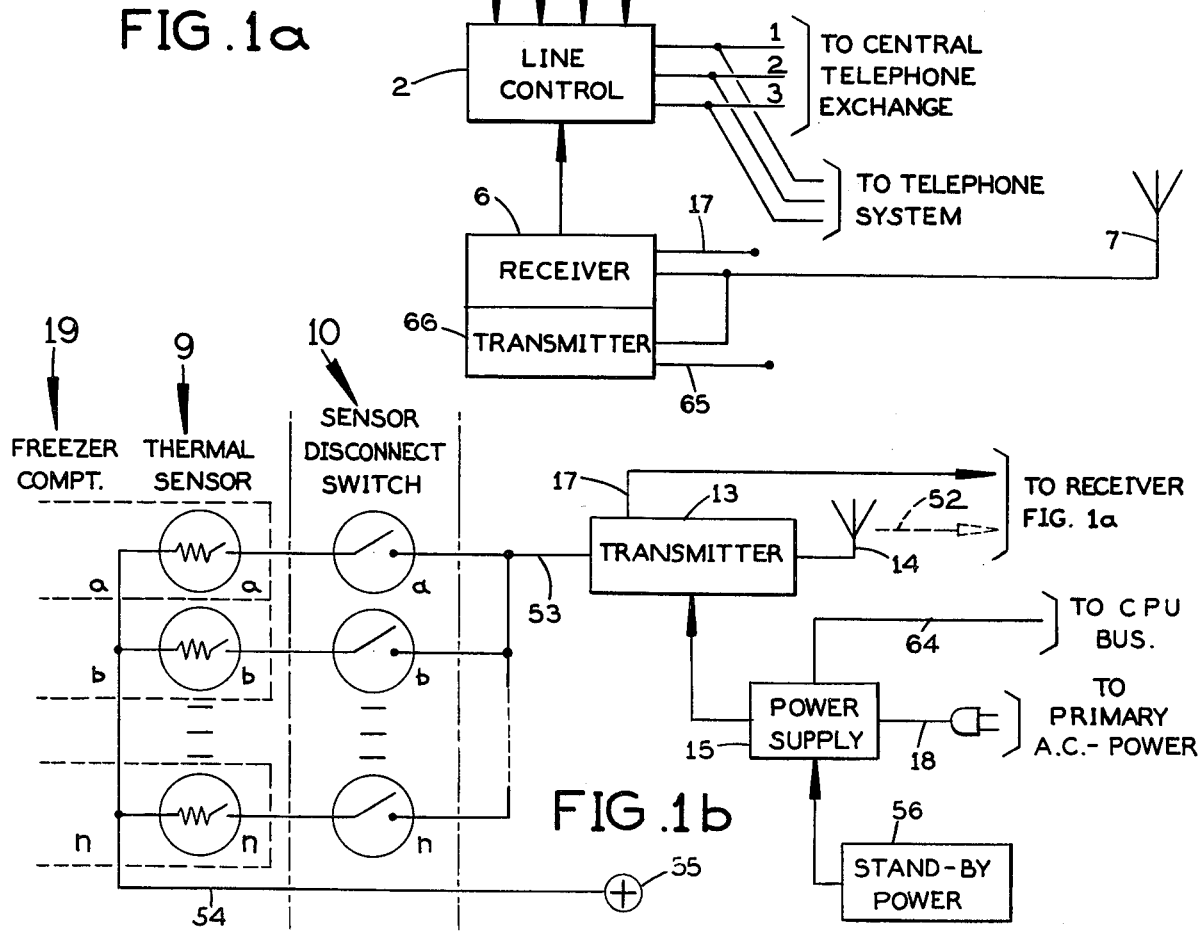
FIG. 1b is a schematic block diagram of a freezer compartment group with sensors connected in parallel connection.

FIG. 1b shows a relatively simple arrangement. A plurality of freezer compartments a, b to n, generally at 19 each contains at least one thermal sensor, generally at 9.

Many different types of thermal sensors are known. The simplest ones contain a bi-metallic strip consisting of two joined metals of different temperature expansion coefficient. Such a strip will tend to bend, the more the higher the temperature. Usually it is combined with electrical contacts that close or open a circuit at a selected temperature. Such thermostats are widely used in residential room heating and cooling systems, where the temperature for opening or closing the contacts may be controlled by a dial. Other thermostat types employ a temperature sensing bulb containing a volatile fluid connected through a capillary tube to a diaphragm or bellows which in turn activate contacts. Still other types of temperature sensors employ solid-state components such as diodes, thermistors and the like, which have a significant degree of thermal sensitivity. The choice of temperature sensor, however, is immaterial to the present invention, since it is not directed to the method of temperature sensing per se.

As shown in FIG. 1b, each thermal sensor is combined with a make-contact, which, upon reaching the selected temperature limit, connects a positive potential source 55 to the common side 54 of the thermal sensors 9. If the temperature in one freezer compartment 19 rises above the selected temperature limit, the thermal sensor's contacts close and apply the positive potential to the input thermal 53 of a transmitter 13.

Sensor disconnect switches generally at 10 serve to manually disconnect a sensor for maintenance purposes.

The transmitter 13 may be directly connected to the line control unit 2, as shown by a wired connection 17, or it may, in place of a wired connection, be connected through a wireless connection, shown in a broken line 52.

A wireless connecting link requires communication on a suitable radio frequency that has been allocated for industrial purposes by the Federal Communications Commission. In its preferred mode of operation, the radio transmitter transmits a continuous radio frequency carrier signal connected to an antenna 14. In the case of an alarm, the carrier is disconnected, which signals the receiver 6 that an alarm has been indicated. The receiver 6 in turn activates the line control 2, which proceeds to set in motion the alarm procedure described above.

Figure 1C:
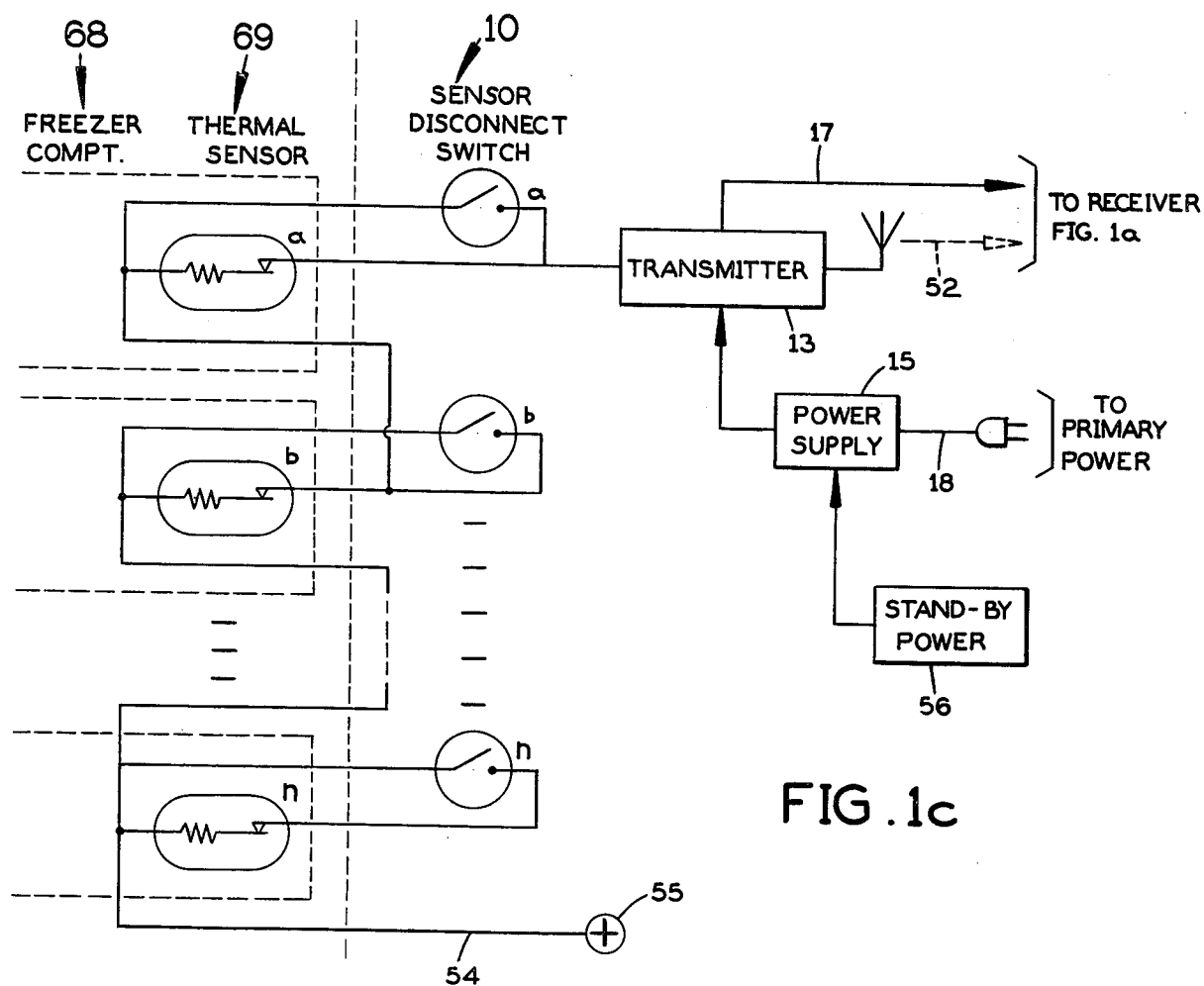
FIG. 1c is a schematic block diagram of a freezer compartment group with sensors in series connection.

In an alternate embodiment the thermal sensors 9a, b to n are equipped with break-contacts that are series connected as shown in FIG. 1C, forming a chain, which at one end is connected to a positive power source 55 and at the other end connected to the transmitter 13. In the case of an alarm, the chain will be broken at the freezer compartment causing the alarm. The thermal sensor disconnect switches 10a, b to n are in this alternate embodiment connected in shunt with each thermal sensor.

The sensor disconnect switches 10a, b to n serve to disable a thermal sensor in cases where the associated freezer compartment is disconnected from the refrigeration system for anyone of a number of reasons, such as maintenance, energy, savings or the like.

Figure 1D:
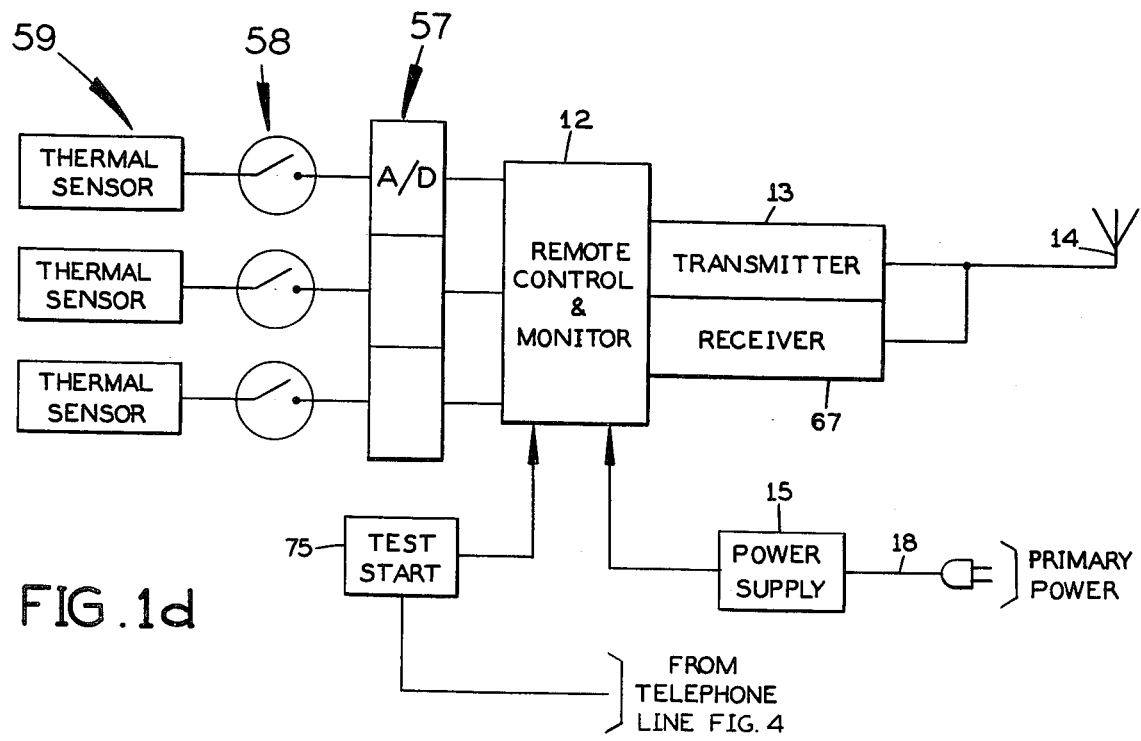
FIG. 1d is a schematic block diagram of a freezer compartment group using sensors with analog-to-digital conversion and two-way communications, link.

FIG. 1d shows an embodiment of the invention that would be the preferred one in large installations with many freezer compartments, where it might be too time consuming for the attending personnel to locate one or a group of freezer compartments that might be causing an alarm. In this case the receiver 6 is paired with a transmitter 66 which may communicate with anyone of a number of transmitter, receiver pairs 13, 67 respectively, each representing a freezer compartment group.

In this manner an interactive two-way communication connection may be established between anyone of the transmitter, receiver pairs 13, 67 and the receiver, transmitter pair 6, 66. Such an interactive connection may enable the common control of FIG. 1a to ascertain the identity of the freezer compartment or the associated freezer compartment group that is causing the alarm. It may do that by sequentially "addressing" each freezer compartment group with a group address and in turn solicit from each group a group status code, which may indicate "alarm" or "no alarm" in that group.

It follows that the two-way interactive connection may also be realized with wired connections, 17 and 65 instead of wireless connections.

In installations that involve large freezer compartment groups, comprising large numbers of thermal sensors it can be advantageous to include means for determining the identity of the individual thermal sensor causing the alarm. To that end the FIG. 1d includes an optional remote control and monitor unit 12 which serves to identify the one or several sensors in the group that causes an alarm by a sensor identity number assigned to each sensor.

FIG. 1d also includes a group of analog-to-digital (A/D) converters 57 which is used in conjunction with thermal sensors 59 of a type that indicate the sensed temperature in analog manner, which can be translated into a number by the analog-to-digital converters 57, and in turn be read in digital form by the two-way interactive communication links described above. Thermal sensors of this type are typically of the solid-state type.

In refrigeration monitor systems, according to the invention, it is to be anticipated that, from time to time, all primary power may be lost. In anticipation of such a condition, the system may comprise stand-by power supplies that may keep the system operative for a period of time. The common control section shown in FIG. 1a shows an optional stand-by power source 56 which is capable of maintaining the system in operative condition for a period of time. A similar optional stand-by power source 56 is shown as part of the freezer compartment group in FIG. 1b.

The stand-by power source 56 may consist of an assembly of dry-cell batteries or rechargeable storage cells with a charging unit connected to the primary power source.

As an additional protective measure, the power supply 5 has interfacing means for a connection 64 to the CPU-bus 8, which serves to indicate to the common control apparatus the loss of primary power. Such a condition would cause an alarm to be transmitted to the telephone numbers used for alarm sending in general, but the alarm would be modified to indicate an alarm of reduced urgency by a suitable message from the tape message announcer 16. Such an alarm of reduced urgency may be designated a "Minor Alarm" as opposed to a freezer alarm that may be designated a "Major Alarm".

The system may possess a more extensive internal monitor capability which is well known from many other reporting and monitoring systems and which automatically reports any system deficiency or malfunction detected by the system's built-in diagnostic apparatus.

Additionally the system may provide alarm indications in the form of suitable indicators disposed on the control panel. Such indicators may be light or numeral displays combined with audible alarms.

OPERATION

The method of operation has been described in parts in the foregoing detailed description of the invention.

The following description of the operation is presented in sequences of steps without detailed recital of the construction elements involved in performing the steps.

Figures 2A, 2B:
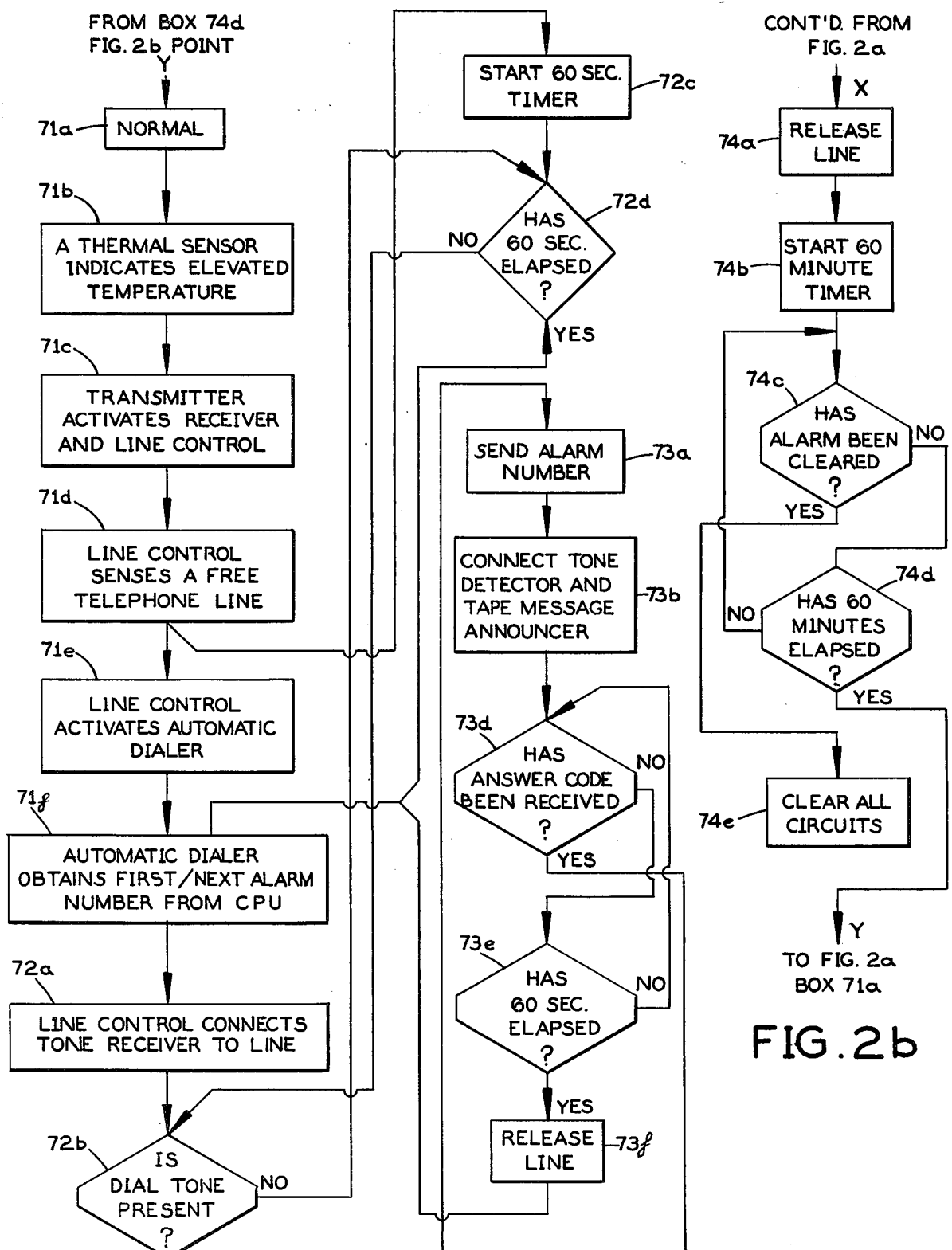
FIGS. 2a and b form a flow-chart diagram of the invention showing the operation in a step-by-step sequence.

FIGS. 2a and 2b show, in standard flow-chart form, the method of operation of the preferred embodiments of the invention. Each step is described briefly in a box with an alpha-numeric label.

On FIG. 2a, box 71a, Normal, the system is in its quiescent state. Next, at 71b one or more thermal sensors indicate elevated temperature. The thermal sensor activates the transmitter of the associated freezer compartment group which activates the receiver (71c). The receiver causes the line control to search for and find a free telephone line (71d). The line control activates the automatic dialler, 71e, which signals the Central Processing unit to send the first, or in later attempts, the next, alarm telephone number,(71f), which is stored on dials on the control panel.

Next, 72a, the line control connects the tone receiver to the line and waits for dial tone from the central exchange (72b) At the same time, a 60 second timer is started (72c). The line control now waits for dial tone.

If dial tone arrives before the 60 seconds have elapsed, the 72b, "yes" port is activated and the alarm number is sent out (73a). If, however, the 60 seconds elapse before dial tone is received, 72d "yes", again activates 71f, which obtains the next alarm number from the CPU. The foregoing sequence from 71f is now repeated again and again each time with a new alarm number or with the numbers used before in the assigned sequence, until the system has successfully managed to seize a line and get dial tone before the seconds have elapsed.

After the alarm number has been sent (73a), the tone detector and the tape message announcer is connected, 73b, and a 60 second timer is started, 73c. At this time the connection to the called number is being established by the telephone exchange and ringing of the called number commences with ring-back tone sent back to the line control. The tape message announcer keeps repeating its message which informs any party who answers the phone of the alarm condition and its location. If the answering party has been prepared for the call, he will send from his Touch-Tone ® telephone the assigned answer code, which will be received by the tone receiver 4 and through the line control and the bus 8 transmitted to the CPU,21. All the above events from 73a through 73e must take place before the elapse of the 60 seconds of the timer 73e. If the answer code is not received at the time the 60 seconds have elapsed, as shown by 73e, port "yes", the line is released (73f) and a new alarm number is obtained from the CPU, and all the above steps 73a through 73f or 74a is repeated.

It should be understood that many of the steps described above are not performed by physical equipment, but exist only as programs stored in the CPU 21 and its associated memory sections 22, 23 and 24.

As a further safety measure to ensure that the trouble condition that gave rise to the alarm in the first place, an optional 60 minute timer 74b is started at the time the line is released. This timer will run until the alarm has physically been cleared by operation of a pushbutton 39, designated "Alarm Clear" on the control panel 22 on FIG. 3.

The steps involved in clearing the alarm are shown in 74c, 74d and 74e, which show that if the alarm has not been cleared at the elapse of 60 minutes after receipt of the answer code in step 73d, the system will again start the entire alarm procedure beginning with step 71b.

It should be understood that the time intervals chosen for the various timing functions described above are chosen arbitrarily and may be set to other values as may be considered better suited for the application in hand.

Additional capabilities for testing the integrity of the entire monitor system may be provided. To this end a Test Start unit 75 in FIG. 1d and FIG. 4 is connected with the test telephone 51 to an incoming line.

If an outside party, for the purpose of testing the system makes an incoming call on that line, the test start unit 75 will detect the ringing signal and activate the remote control and monitor unit 12 on FIG. 1d, simulating an alarm condition. This simulated alarm condition will start the entire alarm procedure as if it were a regular alarm. In this case, the selector switch drive 42 will, through connection 76, be instructed to connect the line control 2 to only the line on which the test alarm was initiated. The test start unit 75 will stay in the test condition until the answer code is received on that line and will prevent the 60 minute timer from starting.

We claim:

1. A refrigeration monitor system for monitoring a freezer or compartments containing perishable products and for automatically transmitting freezer failure alarms, the system comprising:

at least one freezer group comprising a plurality of freezer compartments, each compartment containing at least one thermal sensor having an adjustable upper temperature setting;

at least one telephone line connectable through switching means to at least one remote telephone instrument of the DTMF type having a callable telephone number;

number storage means for storing at least one callable telephone number in machine memory, said number storage means communicating with line control means capable of connecting said number storage means to said telephone line and dialling said callable telephone instrument;

recorded message means for recording and on demand playing recorded messages said recorded message means communicating with said line control means for playing into said telephone line recorded messages;

tone receiver of the DTMF type for receiving tone-encoded signals and codes, communicating with said line control means for receiving signals for start of dialling and receiving manually produced answer codes of the DTMF type from said telephone instrument;

control means responsive to said temperature sensor such that upon attaining said upper temperature setting, said temperature sensor operatively activates said control means to traverse a control program stored in memory, said control program comprising a sequence of steps causing said callable telephone instrument to be dialled by said stored telephone number and to be connected to said recorded message means and to be connected to said DTMF tone receiver means for detection of a manually produced preselected answer code from said DTMF telephone insutrument, said answer code operating to cause said line control to disconnect from said telephone line;

communications means linking said freezer group with said line control having a first radio receiver-transmitter combination in wired two-way communication with said line control means;

a second radio receiver-transmitter combination in wired two-way communication with said thermal sensors;

said first radio receiver-transmitter combination transmitting on a first frequency and receiving on a second frequency;

said second radio receiver-transmitter combination transmitting on said second frequency and receiving on said first frequency;

said first and second radio receiver-transmitter combinations in mutual wireless two-way communications.

2. A refrigeration monitor system as recited in claim 1 further comprising:

first timer means having a preset time limit and operating to monitor the time elapsed from the start of dialling said remote telephone instrument and to disconnect said telephone line in case said preset time element arrives before the receipt of said answer code, further operating to cause the selection of a subsequent telephone number from said number storage means and dialling said telephone number to reach another callable telephone instrument, followed by the steps of connecting said recorded message means to said telephone instrument and the step of connecting said tone receiver to said telephone instrument and the step of resetting and restarting said first time means.

3. A refrigeration monitor system as recited in claim 2 further comprising:

second timer means having a preset time limit, said timer set to start measuring time at the moment of disconnection of said line after receipt of said answer code;

alarm storage means for storing system alarm status, said alarm status stored in memory at the time of arrival of a freezer alarm;

system alarm clearing means for manually resetting said second timer means;

said alarm storage means operating to automatically restart the alarm transmitting procedure in case said second timer means preset time limit arrives before the step of manually resetting said second timer means.

4. A freezer monitor system as recited in claim 3 further comprising means for remote manual testing of the system, said testing means comprising:

a test start unit selectively connected to said telephone line, said test start unit responsive to an incoming telephone call from said callable telephone instrument on said telephone line;

said test start unit operating to initiate a freezer alarm, said test start unit further operating to connect said line control means to dial said callable telephone instrument, and to connect said recorded message means and to connect said tone receiver to said telephone line, said test start unit further operating to inhibit said storage alarm means.

5. A refrigeration monitor system as recited in claim 3 wherein said control means comprise:

a central processing unit, said central processing unit responsive to instructions stored in a read only memory, said read only memory containing a plurality of digitally encoded instructions;

a random access memory, said random access memory storing transient digitally encoded data;

a control panel a bus interconnecting said central processing unit, said read only memory, said random access memory, said control panel and said line control means.

6. A refrigeration monitor system as recited in claim 5 further comprising an automatic dialler, said dialler connected to said central processing unit via said bus and to said line control means.

7. A refrigeration monitor system as recited in claim 5 wherein said number storage means comprises a plurality of dials disposed on said control panel, each dial mechanically connected with a ten-position switch, each switch representing a digit in said telephone number, and each switch readable by said central processing unit via said bus.

8. A refrigeration monitor system as recited in claim 5 wherein said thermal sensor having an adjustable upper temperature setting may have said temperature setting adjusted by means of controls disposed on said control panel.

9. A refrigeration monitor system as recited in claim 5 wherein said alarm storage means for storing system alarm status, said alarm status comprises:

a minor alarm status and a major alarm status;

said minor and major alarm status stored in two memory locations, each alarm status associated with a minor and a major alarm indicator, respectively, said minor and major alarm indicators disposed on said control panel.

10. A refrigeration monitor system as recited in claim 1 wherein said thermal sensor having an adjustable upper temperature setting further comprises a sensor disconnect switch.

* * * * *